United States Patent [19]

Rink et al.

[11] Patent Number: 5,556,439
[45] Date of Patent: Sep. 17, 1996

[54] UNITARY FILTER FOR PYROTECHNIC AIR BAG INFLATOR

[75] Inventors: Linda M. Rink, Liberty; Christopher Hock, Uintah, both of Utah

[73] Assignee: Morton International, Inc., Chicago, Ill.

[21] Appl. No.: 418,910

[22] Filed: Apr. 7, 1995

Related U.S. Application Data

[63] Continuation of Ser. No. 114,211, Aug. 30, 1993, abandoned.

[51] Int. Cl.⁶ .................................................. B01D 46/00
[52] U.S. Cl. ........................... 55/487; 55/495; 55/523; 55/524; 280/740
[58] Field of Search ........................... 55/385.3, 486, 55/487, 495, 523, 524, DIG. 42; 280/728.1, 736, 740, 742

[56] References Cited

U.S. PATENT DOCUMENTS

| | | | |
|---|---|---|---|
| 3,950,263 | 4/1976 | Fukuma et al. | 252/193 |
| 4,265,659 | 5/1981 | Blome | 55/523 |
| 4,316,874 | 2/1982 | Kasama et al. | 422/126 |
| 4,568,595 | 2/1986 | Morris | 55/523 |
| 4,629,483 | 12/1986 | Stanton | 55/487 |
| 4,732,594 | 3/1988 | Mizrah et al. | 55/523 |
| 4,846,906 | 7/1989 | Helferich et al. | 55/523 |
| 4,865,635 | 9/1989 | Cuevas | 55/523 |
| 4,965,101 | 10/1990 | Frei et al. | 427/255 |
| 4,976,760 | 12/1990 | Helferich et al. | 55/523 |
| 5,064,459 | 11/1991 | Unterforsthuber et al. | 55/512 |
| 5,071,457 | 12/1991 | Schmidt, Jr. et al. | 55/523 |
| 5,075,160 | 12/1991 | Stinton et al. | 428/282 |
| 5,196,120 | 3/1993 | White | 55/523 |
| 5,204,068 | 4/1993 | O'Loughlin et al. | 422/180 |
| 5,215,721 | 6/1993 | Tasaki et al. | 55/487 |
| 5,230,726 | 7/1993 | Smith et al. | 55/487 |
| 5,372,380 | 12/1994 | Duffy et al. | 280/704 |

FOREIGN PATENT DOCUMENTS

| | | | |
|---|---|---|---|
| 5048797 | 5/1975 | Japan | 55/523 |
| 833284 | 5/1981 | U.S.S.R. | |
| 1632484 | 3/1991 | U.S.S.R. | |

*Primary Examiner*—C. Scott Bushey
*Attorney, Agent, or Firm*—Taylor J. Ross; Gerald K. White

[57] ABSTRACT

A unitary rigid filter for use in a high temperature, high pressure application in a pyrotechnic airbag inflator includes a matrix structure formed of porous carbonaceous foam material coated with silicon material and having a high thermal conductivity coefficient for absorbing heat from the gases generated on ignition of a pyrotechnic material. The porous, carbonaceous foam has a porosity or permeability of approximately 40 ppi to 80 ppi and a thin, sheet-like liner of porous, ceramic paper is mounted on the body of the foam matrix structure for improving operational characteristics.

22 Claims, 2 Drawing Sheets

UNITARY FILTER FOR PYROTECHNIC AIR BAG INFLATOR

This is a continuation of U.S. application Ser. No. 08/114,211, filed Aug. 30, 1993, now abandoned.

BACKGROUND OF THE INVENTION

1. Field of the Invention

The present invention relates to a new and improved unitary, rigid, drop-in type filter for use in a high temperature, high pressure application in a pyrotechnic airbag inflator. More particularly, the filter is particularly designed to withstand the high temperature and high pressures encountered from contact with gas generated in a pyrotechnic airbag inflator from gas generating material such as sodium azide wafers. The filter functions to cool the hot gases before they reach the airbag and serves to eliminate and trap particulates and residues generated during ignition so that they do not enter the airbag and contaminate the vehicle.

2. Background of the Prior Art

In prior pyrotechnic airbag inflators, wire or metal mesh or screen has been used to filter the gaseous flow emanating from the ignition of the pyrotechnic materials of an airbag inflator, before the gases enter the airbag. Japanese unexamined Patent Publication No. 50-48797 discloses an air permeable trap or filter of granules or particles used to screen or filter gaseous flow from an airbag inflator before the gas enters the airbag.

A major concern in pyrotechnic type airbag inflators is that the expanding gas generated for inflation of an airbag is so high in temperature that burning of the airbag or injury to a passenger occurs when the airbag is inflated. Sometimes, pyrotechnic material is ignited to generate high temperature gas which contains impurities such as molten or gaseous metals and oxides which are toxic and cause damage to the human body.

OBJECTS OF THE INVENTION

It is therefore an object of the present invention to provide a new and improved filter for a pyrotechnic airbag inflator.

It is another object of the invention to provide a new and improved filter for a pyrotechnic airbag inflator which is capable of absorbing substantial quantities of heat so that the high temperature of the gases is greatly reduced before the gases enter an airbag for inflation.

Yet another object of the present invention is to provide a new and improved filter of the type described which is capable of trapping and filtering out impurities such as molten or gaseous metals that would otherwise be carried along in the gas stream resulting from the ignition of pyrotechnic material for airbag inflation.

Still another object of the present invention is to provide a new and improved filter of the character described which is capable of screening out residues and particulate materials which are toxic to humans before the gas enters to inflate an airbag after pyrotechnic ignition.

Yet another object of the present invention is to provide a new and improved filter of the character described which permits a high volume of gas flow therethrough at high velocities without a substantial pressure loss or restriction causing unacceptable delay in airbag inflation time yet still providing excellent filtering characteristics for removing impurities and providing a substantial cooling effect on the gases passing through the filter.

Another object of the present invention is to provide a new and improved unitary, rigid, drop-in type filter of the character described which is easily assembled into a pyrotechnic airbag inflator module.

Still another object of the present invention is to provide a new and improved filter which does not employ loosely packed particulates or granules but instead, utilizes a rigid, unitary matrix structure of porous, carbonaceous material which is resistant to high temperature, high pressure and which remains intact and does not burn or disintegrate upon the rapid flow of hot gases therethrough.

Another object of the present invention is to provide a new and improved filter of the character described which is relatively low in cost and which provides high cooling efficiency, high uptake collection efficiency of any toxic materials or particulates contained in the expanding gas with relatively little impedance to the flow of gas at high velocities therethrough.

Still another object of the present invention is to provide a new and improved filter which does not erode, burn, shatter or break up when subjected to the high impact pressure of a rapid gas flow of high temperature gas resulting from pyrotechnic ignition of gas generating material.

Still another object of the present invention is to provide a new and improved high efficiency filter of the character described which is capable of withstanding compressive forces in the neighborhood of 2500 psi, tensile forces in the neighborhood of 12000 psi and thermal shocks of up to 2500° F. from hot gases generated during the rapid ignition of pyrotechnic material of an airbag inflator.

Still another object of the present invention is to provide a new and improved filter of the character described which will remain intact and not erode or break into pieces even when subjected to a 3000 psi load over a 1 millisecond time interval during ignition followed by another 3000 psi load exerted over a 20 millisecond time frame during airbag inflation as hot gas flows therethrough.

Yet another object of the present invention is to provide a new and improved filter of the character described which is relatively inert and does not chemically interact with the gases generated from solid wafers of pyrotechnic materials such as sodium azides commonly used in pyrotechnic airbag inflators.

Yet another object of the present invention is to provide a new and improved filter of the character described which can withstand internal temperatures of over 2500° F. for a period of over 100 milliseconds.

Still another object of the present invention is to provide a new and improved filter of the character described which is capable of removing and retaining metal oxides and other impurities in gas flow generated by pyrotechnic material down to a residual level below 1 gram of residue material after passage through the filter.

BRIEF SUMMARY OF THE PRESENT INVENTION

The foregoing and other objects and advantages of the present invention are accomplished in a new and improved unitary, rigid, drop-in type filter for use in high temperature, high pressure applications in a pyrotechnic airbag inflator. The filter comprises a matrix structure formed of porous, carbonaceous foam material coated with a ceramic material and having a large surface area with a high thermal diffusivity coefficient and a porosity rating of approximately 40 ppi to 80 ppi. The filter is provided with a liner formed of thin, porous ceramic paper having a permeability factor of 30 to 200 CFM per square foot at a differential pressure drop of ½" of water.

BRIEF DESCRIPTION OF THE DRAWINGS

For a better understanding of the present invention, reference should be made to the following detailed description taken in conjunction with the drawings, in which.

DETAILED DESCRIPTION OF A PREFERRED EMBODIMENT OF THE INVENTION

Figure 1:
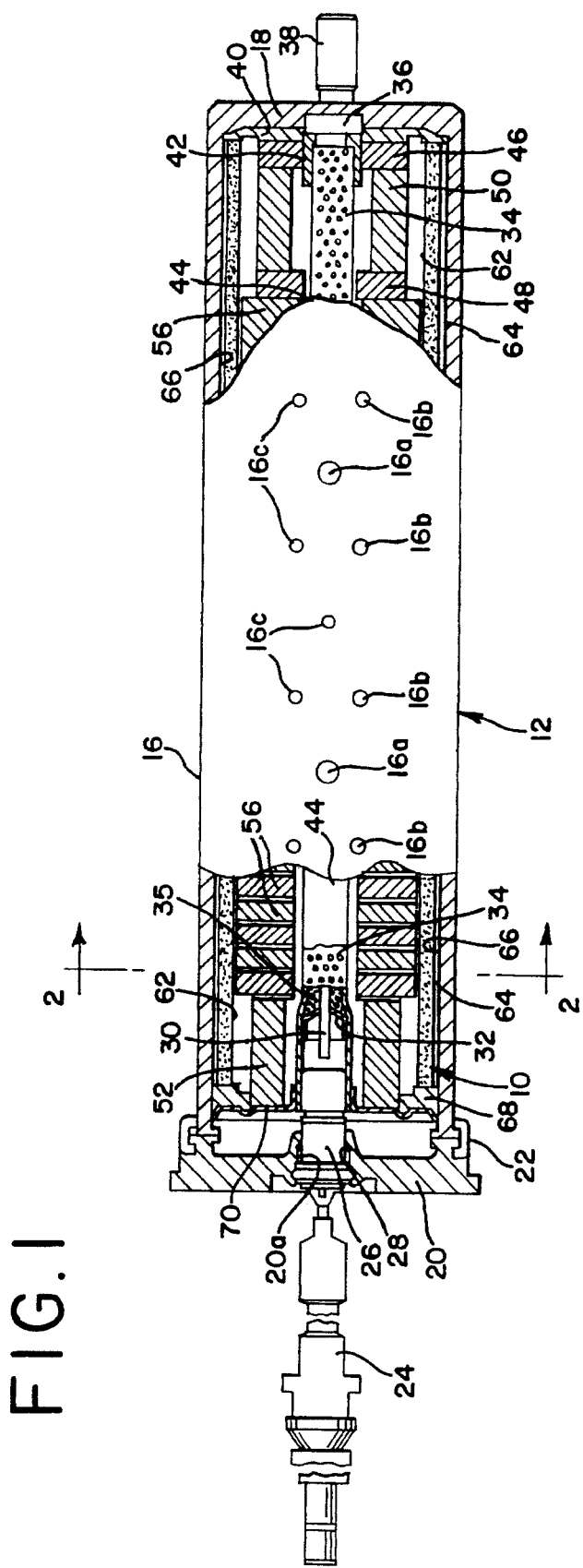
FIG. 1 is a side elevational view of a pyrotechnic airbag inflator module with portions cut away and in section showing a new and improved filter constructed in accordance with the features of the present invention.
Figure 2:
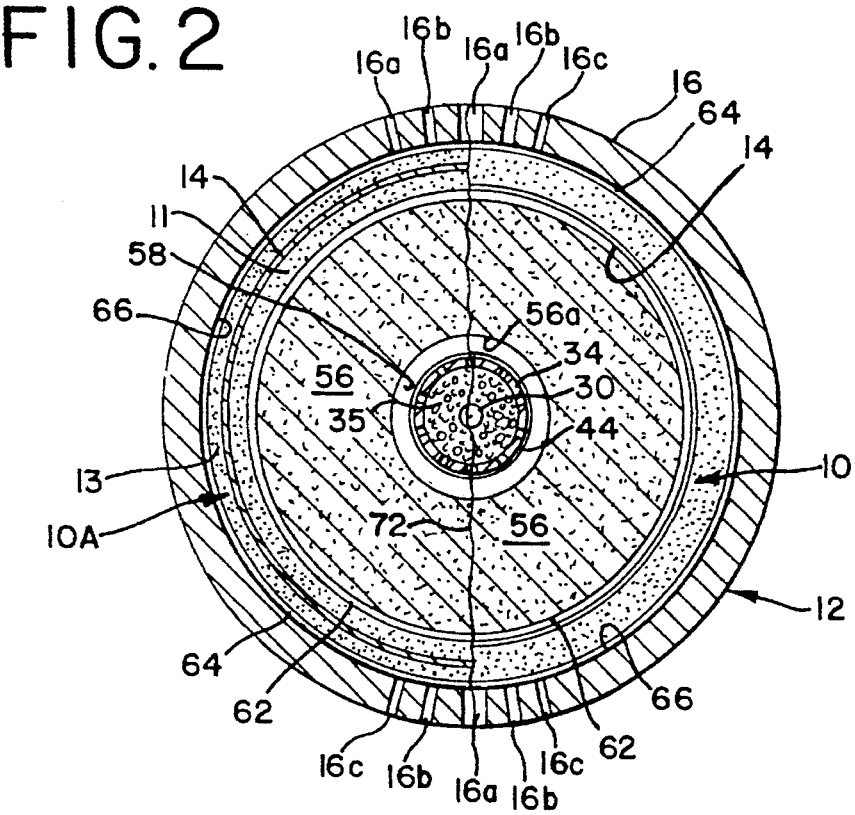
FIG. 2 is a transverse cross-sectional view taken substantially along lines 2—2 of FIG. 1 and showing on one side thereof a first embodiment of a filter in accordance with the present invention and on an opposite side, a second embodiment of a filter in accordance with the present invention.

Referring now more particularly to the drawings, therein is illustrated a new and improved filter 10 constructed in accordance with the present invention and especially designed for high temperature, high pressure applications in a pyrotechnic airbag inflator module 12 as shown in FIGS. 1 and 2. The filter 10 comprises a unitary, rigid matrix structure of generally cylindrical shape having concentric inner and outer wall surfaces. The filter 10 is formed of strong, relatively rigid, carbonaceous, open celled foam material that is covered with a ceramic coating. The filter 10 serves to efficiently cool a high temperature gas stream passing therethrough that flows from the interior surface and passes radially outwardly for rapid inflation of an airbag or the like. The filter 10 additionally serves to collect and retain particulates, contaminants and toxic materials that may be developed during the generation of gas by pyrotechnic means so that the gas leaving the filter to inflate an associated airbag has less than 1 gram of residual solids therein.

Figure 3:
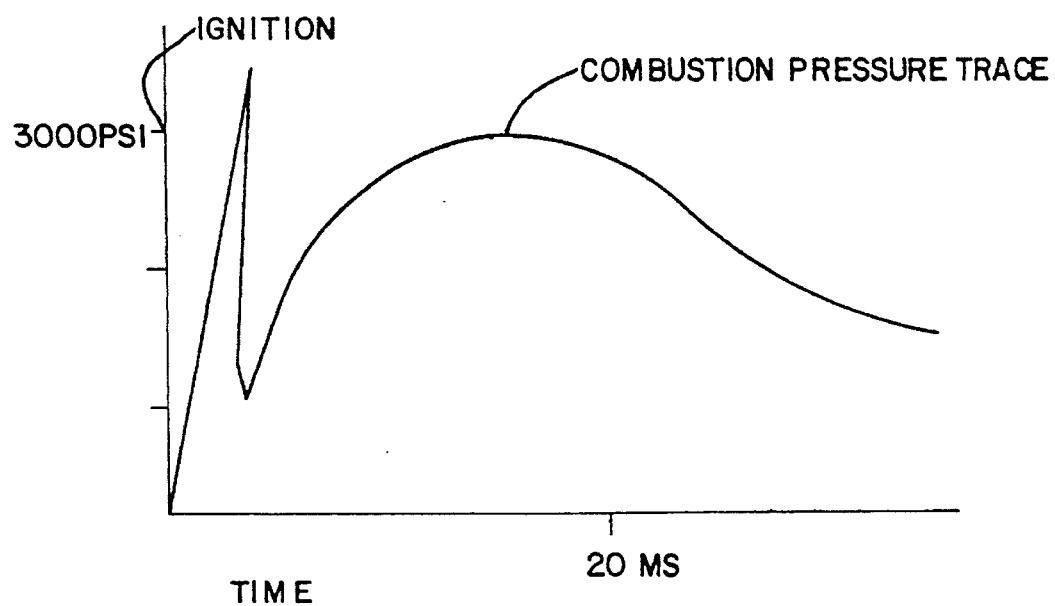
FIG. 3 is a graphical representation of the combustion pressure generated during an inflation cycle of a pyrotechnic airbag inflator module plotted against time after ignition occurs during an airbag inflation test in a test chamber.

Referring momentarily to the graph of FIG. 3, when an electrical signal is generated to ignite a pyrotechnic element positioned within the interior of the filter 10, an ignition spike of high pressure in the range of 3000 psi develops for a very short interval, usually a duration of less than 1 millisecond and thereafter, after the spike has subsided, a combustion pressure is developed. The graph illustrates a pressure trace within a test tank as the combustion process that generates release of gas takes place. As the hot gas moves through the filter 10, a pressure of 3000 psi may be attained and relatively high pressure may be present for as long as a 20 millisecond interval.

It should thus be seen that the filter 10 is subjected to an initial high pressure shock wave when an airbag is inflated and must be able to withstand this ignition spike or shock wave of up to 3000 psi loading for 1 millisecond. Thereafter, the filter 10 must be able to withstand a 3000 psi loading which may last for an additional period of up to 20 milliseconds. In addition to the pressure shock, the filter 10 is also subject to thermal shock due to the high temperature of the hot gases that are released during ignition. The porous, matrix material of the unitary filter 10 must be capable of withstanding thermal temperatures in the neighborhood of up to 2500° F. without decomposing, melting and without entering into chemical union with the gases that are generated in the pyrotechnic airbag inflator.

In accordance with the present invention, the filter 10 is made of carbonaceous foam material comprising a graphite material having a silicon carbide coating thereon. This coating is applied to the carbon matrix in an electrodeposition process or in a vapor deposition process. Both silicon and carbon are relatively inert in a chemical sense and are able to handle the high temperatures and pressures involved. The carbon foam of the filter 10 is generally a reticulated material initially in the form of a slurry which is subjected to a burn out process leaving a unitary, porous, rigid matrix body structure of the desired shape and dimensions.

It has been found that a carbide foam, filter 10 having a silicon coating thereon is able to withstand compressive stresses of 2500–3000 psi and tensile stress of as high as 12000 psi without substantial fracturing or disintegration, and without entering into chemical union with the gaseous materials passing therethrough even when temperatures of up to 3000° F. are present. The matrix foam structure of the carbonaceous foam, filter 10 has a relatively large surface area with a relatively high thermal diffusivity coefficient so that hot gases passed therethrough give up substantial quantities of heat to the filter in a short time period. The filter 10 is permeable or porous and provides a large area for heat transfer to take place as the gases pass therethrough in intimate contact during an ignition cycle of the airbag inflator module 12.

It has also been found that a carbonaceous foam material making up the body of the filter 10 can have a porosity or permeability rating of approximately 40 ppi up to 80 ppi and with this type of permeability, obstruction in the filter to rapidly expanding hot gas flow is minimized even though the flow occurs at extremely high velocities. The filter 10 thus does not impede rapid inflation of an airbag once the airbag inflator module 12 is activated by an electrical signal. The porosity or gas permeability of the matrix structure of the filter 10 may also be measured in terms of the flow rate for a given gas pressure drop across the filter from inside to outside. For example, it has been found that a cylindrical sleeve of carbonaceous foam material of a filter 10 having a gas permeability rating in the range of 10–50 cubic feet per minute per square foot of surface area subjected to a pressure differential of one-half inch of water across the filter wall from inside to outside is a suitable porosity that permits rapid expansion of hot gases during ignition and gas generation without substantially impeding or slowing up the inflation time for inflating an airbag.

In order to better trap, collect and maintain any particulate matter or other contaminants which may be present in the hot gases as ignition of the pyrotechnic element of the airbag inflator module 12 takes place, the filter 10 is provided with a thin, sheet or liner 14 on the interior surface thereof outwardly surrounding a pyrotechnic gas generator. The liner 14 is formed of ceramic paper having a thickness of 0.030" to 0.060" at 8 psi and has a permeability or porosity value of 30–200 CFM per square foot of surface area at a pressure drop of ½" of water. The ceramic paper comprises a porous structure of aluminum or carbon silicates. The ceramic paper liner 14 comprises approximately 30% to 70% $Al_2O_3$ and approximately 70% to 30% $SiO_2$.

A source of ceramic paper in the desired thickness and permeability range suitable for fabricating the liner 14 may be obtained from the Lydall Company. A product known as 1-Lydall 630 has been successfully tested as a liner with excellent results. A source of carbonaceous foam filter material may be obtained from the Ultramet Company of 12173 Monteg Street, Tacomia, Calif. 91331. In a filter 10 constructed in accordance with the features of the present invention and successfully tested, a cylindrical filter sleeve was used having an inside diameter of approximately 1.53" to 1.55" and an outside diameter of 2.15" to 2.17" and a length of 6.64" to 8.94". These test units were sized for use in a passenger side airbag inflator module 12. Filters 10 having different size parameters may be used for a driver's side airbag module contained in a central section of a steering wheel.

In accordance with the present invention, the unitary body of the filter 10 may also be made of vitreous bonded aluminum oxide or vitreous bonded silicon carbide having substantially the same strength, flow and gas permeability characteristic as previously mentioned heretofore. These vitreous bonded types of materials can be obtained from the Refractron Technologies Corporation of 5150 Stuart Avenue, Newark, N.Y. A filter surface of a filter 10 formed of vitreous bonded aluminum oxide or vitreous bonded silicon carbide can be coated with a membrane coating of vitreous bonded aluminum oxide or vitreous bonded silicon carbide, respectively, for capturing fine particulates carried by the gas passing through the filter thus eliminating the need for a layer of ceramic paper 14 in the filter design.

Referring now briefly to the airbag inflator module 12, the module includes a cylindrical outer housing 16 formed of strong and lightweight aluminum and enclosed at one end by an integral circular end wall 18. A separate cap member 20 is provided at the opposite end and is secured in place with an annular sealing ring 22 after all of the internal components of the module are in place within the housing. The end cap 20 is provided with a central aperture 20a in order to accommodate an ignition connector assembly 24 which includes an initiator 26 seated within the aperture 20a and provided with an O-ring 28 to insure a gas tight seal. An inner end of the ignition connector assembly 24 includes a fuse-like element 30 which projects through an end cap 32 mounted in the end portion of a hollow igniter tube 34 formed of perforated steel and containing a charge of igniter granules 35 of $BKNO_3$.

At the closed end wall 18 of the aluminum housing 16, there is provided an internal auto ignition cup 36 and a coaxial external threaded stud 38 is provided for mounting of the airbag inflator module 12 in position in a motor vehicle. The perforated steel igniter tube 34 is provided to contain the igniter granules 35 and is coaxially aligned with the center axis of the aluminum housing 16. A silicon pad 40 having a cup-like boot screen assembly 42 at the center thereof is provided to help maintain the adjacent end of the igniter tube 34 in concentric alignment. The steel igniter tube 34 is perforated and is enclosed within an aluminum foil wrapping 44 which is adapted to retain the ignition granules 35 in place. The foil layer 44 is easily ruptured upon ignition to permit the expanding hot gases to move out through the apertures of ignition tube 34 when ignition takes place.

At a right hand end portion of the airbag inflator 12, as viewed in FIG. 1, there is provided a pair of annular damper pads 46 and 48 maintained in longitudinally spaced apart relation by means of an annular spacer 50. A similar spacer 52 is provided at the opposite end adjacent the end cap 20. The damper pads 46, 40 and 48 and spacers 50 and 52 have a common outer diameter and are mounted in concentric relation around the igniter tube 34 and are secured in place inside of the filter 10 extending longitudinally of the housing 16 and surrounding the igniter tube 34 in concentric relation.

A plurality of gas generating wafers 56 are arranged in a cylindrical configuration along the length of the airbag inflator module 12. The gas generating wafers 56 are formed of sodium azide material of washer-like shape having an inner diameter 56a that is slightly larger than the outer diameter of the foil-covered igniter tube 34 so as to define an inner chamber or plenum 58 for initially receiving the hot gases generated by the ignition granules 35 when the fuse 30 is charged with electrical energy.

As hot gases from the ignition of the granules 35 perforate or burst the aluminum foil 44 around the steel igniter tube 34, the gases enter the inner plenum chamber or annulus 58 and begin to ignite the gas generating wafers 56 contained within the filter 10. As the sodium azide wafers 56 ignite, nitrogen gas is released at high pressure and high temperature and this gas flows outwardly and through the filter 10.

In accordance with the present invention, the rapidly expanding pyrotechnic generated gases flow outwardly from the annular plenum 62 through the cylindrical, unitary, filter 10 and heat is absorbed by the filter for cooling the gases. Substantially all of the solid particles and residue carried by the expanding gas moving outwardly through the filter 10 is trapped and contained so that less than 1 gram of solid residual material enters an expanding airbag coupled with the inflator module 12. The filter 10 has a porous matrix structure of carbonaceous foam and does not tend to react chemically with the hot gases. In addition, the foam structure is rigid and strong enough to resist thermal shock as well as pressure shock as previously discussed.

The filter 10 in accordance with the invention remains intact and does not disintegrate or burn out even though subjected to these relatively high pressures and temperatures. The expanding hot gases pass through the porous, ceramic paper liner 14 and move through the body of the porous filter 10 into an open space or a plenum 64 surrounding the exterior surface of the filter. The pressure of the gas is equalized along the length of the plenum 64 from end to end within the interior of the aluminum housing 16.

As viewed in FIG. 2, the wall of the aluminum housing 16 is formed with upper and lower regions having perforations therein in order to permit the expanding hot gases to escape outwardly to fill and rapidly expand an airbag into deployment. As shown in FIG. 1, some of the perforations 16a in the housing 16 are relatively large in diameter whereas other perforations 16c are smaller in diameter. Mid-size perforations 16b are also provided at spaced intervals longitudinally along the length of the housing 16. The different sizes of perforations help to equalize the gas flow along the length of the housing 16 in order better to accommodate a wide range of operating ambient temperatures, for example, from a low of −30° C. to a high of 80° C. The large diameter perforations 16a are provided for operation in all temperature conditions whereas the small diameter perforations 16c are provided for operation in high temperature conditions, and the mid-size perforations 16b are utilized for medium range and hot temperatures.

The airbag inflator module 12 is provided with a layer of aluminum foil 66 that is 2–6 mils in thickness mounted on the inside surface of the aluminum housing 16. As the hot gases pass through the filter 10, the foil 66 bursts adjacent the openings 16a, 16b and 16c in the housing wall to permit the hot gases to rapidly escape from the housing 16 to inflate an airbag. Generally, the wall thickness of the housing 16 is approximately ⅛" and the high pressure gases inside easily burst the layer of foil 66 around the inside surface of the housing in the areas of the perforations 16a, 16b and 16c.

Referring to FIG. 1, the unitary, rigid, drop-in, filter 10 as described herein is placed in concentric alignment around the sodium azide wafers 56. This can be done before or after the wafers 56 and components internally thereof have been loaded into the housing 16 from the left hand end while the cap 20 is not in place. Because the filter 10 is a rigid unitary structure of substantial strength and integrity, it can be easily assembled with the other components of the airbag inflator module 12, and may also be inserted easily into the housing 16 from the open end even after the other components have been positioned in place in the housing 16.

As illustrated, an inner end portion of the filter 10 is inserted lengthwise into the housing 16, until the end bears against the silicone pad 40 and then, an annular silicone pad 68 is placed against the opposite one end so that the filter is subjected to lengthwise compression between the pads when a metal retainer dish 70 is installed to close the housing 16 before the end cap 20 is secured in place with the ring 22.

Referring now to the left hand portion of FIG. 2 to the left of a break line 72, therein is illustrated another embodiment of a filter 10A constructed in accordance with the features of the present invention and generally similar from an operational standpoint to the filter 10 previously described herein. Instead of a unitary body of carbonaceous foam having a single gas permeability or porosity characteristic as in the filter 10, the filter 10A is formed with an inside element 11 having a porosity or gas permeability rating that is greater or higher than an outer element 13 mounted in concentric relationship therewith. The inner element 11 filters out larger particulates like a combustion screen and the outer element 13 traps the smaller particulates. For example, the inner filter element 11 has a porosity rating of 40 pores per inch (ppi) ±20 ppi and the concentric outer filter element 13 has a porosity rating of 80 ppi ±20 ppi. In addition, a layer of ceramic paper 14 is interposed or sandwiched in between the inner and outer elements 11 and 13. The multi-element filter 10A provides a lower initial resistance to gas flowing by virtue of the greater porosity of the inner filter element 11 and because of the intermediate placement of the porous layer 14 of ceramic paper which is encountered thereafter before penetration of the outer filter element 13. In general, the operating characteristics of the filters 10 and 10A are the same and both function to provide efficient cooling of the gases flowing therethrough and entrapment of contaminants and impurities which could cause burning or toxic effects to persons in the immediate vicinity upon airbag deployment.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A filter for a pyrotechnic airbag inflator, comprising:
   a hollow, tubular sleeve formed of strong, rigid, carbonaceous open celled material covered with a ceramic coating, said sleeve having a gas permeability rating in the range of 10–50 CFM per square foot of surface area under a pressure drop of ½" of water; and
   a tubular liner inside said sleeve formed of thin porous ceramic paper having a gas permeability rating of 30–200 CFM per square foot of surface area at a pressure drop of ½" of water.
2. The filter of claim 1, wherein:
   said material of said tubular sleeve includes a foam having a porosity of approximately 80 ppi.
3. The filter of claim 2, wherein:
   said foam has a substantially uniform porosity between an inner and outer surface thereof.
4. The filter of claim 1, wherein:
   said tubular sleeve includes an inner element formed of open celled foam material having a porosity of approximately 40 ppi and a concentric outer element secured thereto having a porosity of approximately 80 ppi.
5. The filter of claim 4, wherein:
   said tubular liner is sandwiched between said inner and outer elements.
6. The filter of claim 1, wherein:
   said open celled material comprises graphite having a silicon carbide coating thereon applied in a vapor deposition process.
7. The filter of claim 1, wherein:
   said open celled material comprises graphite having a silicon carbide coating thereon applied in an electro-deposition process.
8. The filter of claim 1, wherein:
   ceramic paper liner is formed of material including alumina and silicon oxide.
9. The filter of claim 8, wherein:
   said material of said ceramic paper liner comprises approximately 30% to 70% $Al_2O_3$ and approximately 70% to 30% $SiO_2$.
10. The filter of claim 1, wherein:
    said open celled material of said sleeve is formed in a slurry and subjected to a burn out process leaving a unitary porous matrix structure.
11. A unitary, rigid, filter for use in a high temperature, high pressure application in a pyrotechnic airbag inflator, comprising:
    a matrix structure of porous carbonaceous foam material coated with ceramic material and having a relatively large surface area and a relatively high thermal diffusivity coefficient with a porosity of approximately 40 ppi to 80 ppi; and
    a liner of thin porous ceramic paper on said structure.
12. The filter of claim 11, wherein:
    said matrix structure includes a first element facing toward a gas generator of said inflator and a second element joined to said first element and facing away from said gas generator.
13. The filter of claim 12, wherein:
    said first element has a greater porosity than said second element.
14. The filter of claim 13, wherein:
    said first element has a porosity rating of approximately 40 ppi and said second element has a porosity of approximately 80 ppi.
15. The filter of claim 12, wherein:
    said liner of ceramic paper is interposed between said first and second elements.
16. The filter of claim 11, wherein:
    said ceramic paper liner is formed of alumina and silicon oxide.
17. The filter of claim 11, wherein:
    said matrix structure comprises foamed graphite material coated with silicon carbide.
18. The filter of claim 1, wherein:
    said ceramic paper liner has a gas permeability rating of 30–200 CFM per square foot of surface area at a pressure drop of ½" of water.

19. The filter of claim 1, wherein:
said carbonaceous foam of said sleeve is formed in a slurry and subjected to a burn out process wherein said porous matrix structure remains.

20. The filter of claim 1, wherein:
said ceramic paper liner is positioned to face toward a gas generator of said airbag inflator.

21. The filter of claim 11 wherein said foam material of said sleeve is subjected to a burn out process leaving a unitary porous matrix structure.

22. The filter of claim 1, wherein said open-celled material of said sleeve is subjected to a burn out process leaving a unitary porous matrix structure.

* * * * *